April 22, 1924.
J. A. BRUSS
1,491,513
COMPRESSION BRAKE FOR MOTOR VEHICLES
Filed April 9, 1923    2 Sheets-Sheet 1
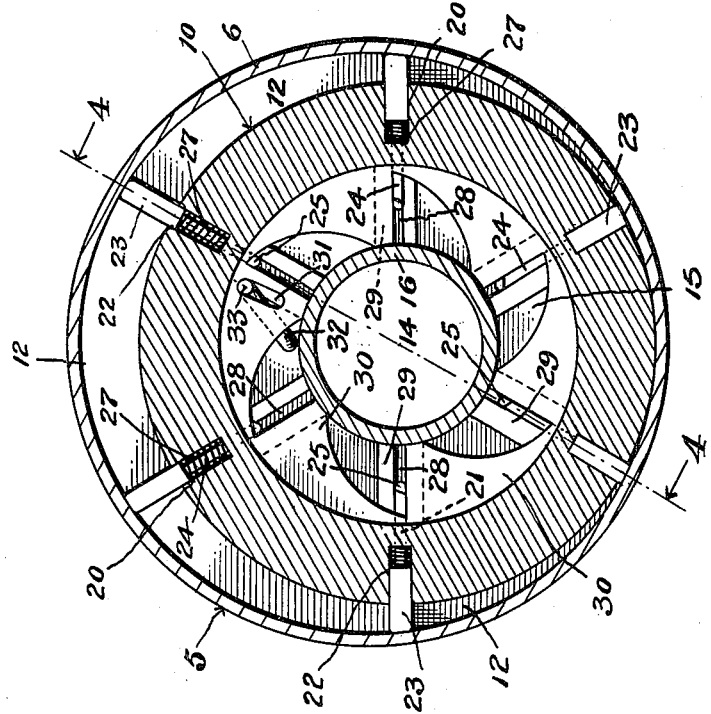
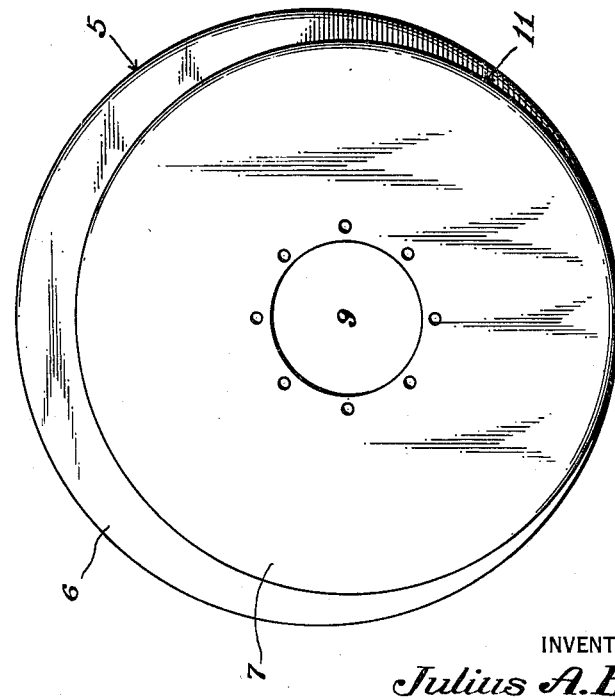
INVENTOR
Julius A. Bruss
BY
John W. Maupin
ATTORNEY April 22, 1924.
J. A. BRUSS
1,491,513
COMPRESSION BRAKE FOR MOTOR VEHICLES
Filed April 9, 1923   2 Sheets-Sheet 2
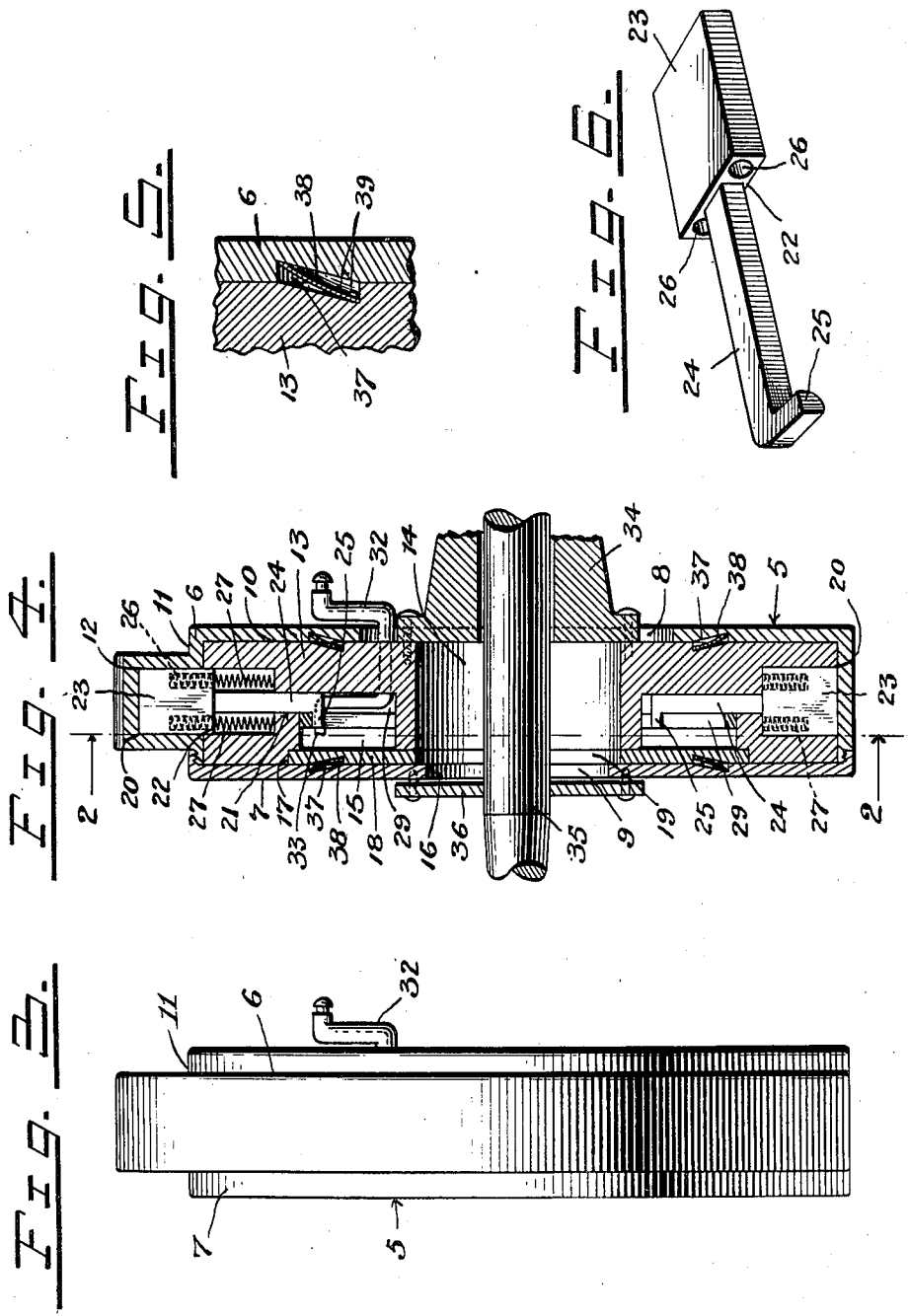
INVENTOR
Julius A. Bruss
BY John W. Maupin.
ATTORNEY Patented Apr. 22, 1924.

1,491,513

UNITED STATES PATENT OFFICE.

JULIUS A. BRUSS, OF SEATTLE, WASHINGTON.

COMPRESSION BRAKE FOR MOTOR VEHICLES.

Application filed April 9, 1923. Serial No. 630,790.

*To all whom it may concern:*

Be it known that I, JULIUS A. BRUSS, a citizen of the United States, residing at Seattle, in the county of King and State of Washington, have invented a new and useful Compression Brake for Motor Vehicles, of which the following is a specification.

My invention relates to improvements in compression brakes for motor vehicles and the principal objects of my invention are to provide a brake whereby the use of compression as the braking power tends to eliminate friction with its attendant wear, furnishes a smooth and silent yet positive action, and supplies a brake which will retain its adjustment for a long period of time.

Further objects are to provide a brake which is self lubricating, durable, close fitting, and which will withstand the harmful effects of water, mud and dust.

With the above and other objects in view which will appear as the description proceeds, the invention consists of the novel construction, adaptation, arrangement and combination of parts hereinafter described and claimed.

These objects are accomplished by devices illustrated in the accompanying drawings; wherein—

Figure 1 is a view in end elevation of my compression brake;

Fig. 2 is a view in vertical section taken substantially on a broken line 2, 2 of Fig. 4;

Fig. 3 is a view in side elevation;

Fig. 4 is a view in vertical section taken on a broken line 4, 4 of Fig. 2;

Fig. 5 is a fragmentary detail view in vertical section showing the arrangement of the flap gasket; and Fig. 6 is a detail view in perspective of one of the vanes.

Referring to the drawings throughout which like reference numerals indicate like parts, the numeral 5 designates the brake drum as a whole while the numeral 6 designates its body member and the numeral 7 designates its cover member threadedly mounted thereon. Said body member is provided with a relatively large annular opening 8 and said cover member is provided with a smaller annular opening 9 extending axially therethrough. Said brake drum comprises a chamber 10 concentric with said annular openings and an annular shoulder 11 formed thereon eccentric with said chamber 10 and forming an eccentric chamber 12 adjacent the upper side thereof which merges tangentially into said concentric chamber 10 at its lower portion.

A core 13 fits snugly within the concentric chamber 10 and is provided with a concentric opening 14 which is of smaller diameter than the opening 8. An annular recess 15 extends into said core from the cover member 7 forming a collar 16 around the opening 14 and an annular shoulder 17 is formed around the edge of said recess to admit a lid 18 interposed between said core and the cover member 7. Said lid is provided with a central opening 19 registering with the opening 14 and fits flush against the collar 16 to form a closed compartment of said recess 15.

The core 13 is provided with a plurality of spaced apart rectangular slots 20 radially extending into the periphery thereof and a plurality of apertures 21 communicate from said slots to the recess 15. Vanes 22 having palms 23 adapted to fit snugly within said slots and arms 24 arranged to extend through said apertures 21 into said recess are provided with fingers 25 on their inner ends. The under side of said palms are provided with holes 26 on either side of said arms and springs 27 are inserted therein to bear against the bottoms of the rectangular slots 20 for reasons presently set forth.

Grooves 28 are formed in radial alignment with the slots 20 by ribs 29 on either side thereof and serve as guides for the arms 24. The fingers 25 extend above said ribs and a multiple annular cam 30 fitting snugly within the recess 15 and bearing against said ribs is arranged to engage said fingers and actuate said vanes as clearly shown in Figures 2 and 4 of the drawings. Said multiple cam is provided with a slot 31 and a crank member 32 extending through the core 13 within the opening 8 and into the recess 15 is arranged with its inner end 33 in engagement with said slot.

Referring to Fig. 4 of the drawings, my brake is usually installed by securing the portion of the core 13 exposed by the opening 8 to the axle housing 34 or to some other fixed part. The brake drum as a whole is connected to turn with the axle 35, as for instance by a collar 36 fixedly secured thereto. The eccentric chamber 12 is filled with a heavy lubricant such as crude oil or the like. It will be understood that all parts are close fitting to prevent leakage of said lubricant under pressure.

In order to further prevent leakage as illustrated in Fig. 5, complemental annular grooves 37 are provided in the body portion 6 and the corresponding adjacent portion of the core 13, and likewise in the cover member 7 and lid 18. Annular flap gaskets 38, composed of a tough flexible material, are installed in said complemental grooves and secured at their inner edge portions by fastenings 39. It will be obvious that said gaskets will serve as flap valves to prevent the escape of the lubricant.

In the drawings the brake is shown as locked and it will be evident that same may be completely unlocked by moving the crank member 32 a sufficient distance for the multiple cam 30 to draw the vane palms 23 entirely within the core slots 20. In this position the drum 5 will revolve freely around the core 13. Any desired amount of brake power between this position and the locked position may be had by moving said crank member in the opposite direction when said vane palms will be projected within the eccentric chamber 12. At the instant said palms project within said chamber compression will be generated by the entrapped lubricant as it passes through the reduced space in going over each succeeding vane. Any small amount of oil which leaks through will serve to lubricate the axle and running parts.

From the foregoing description taken in connection with the accompanying drawings the form of construction and method of operation of my compression brake for motor vehicles will be readily apparent to those skilled in the art to which the invention relates, and it will be understood that the apparatus shown is merely illustrative and that such changes may be resorted to as are within the scope and spirit of the invention.

Having thus described my invention what I claim and desire to secure by Letters Patent is:—

1. A compression brake for motor vehicles comprising a brake drum having a concentric chamber and a reduced eccentric chamber communicating therewith, a core member revolubly mounted within said concentric chamber having radial slots therein, vanes disposed in said slots adapted to project within said eccentric chamber, springs for said vanes, a multiple cam adapted to actuate said vanes, and crank means for said cam.

2. A compression brake for motor vehicles comprising a brake drum having a concentric chamber and a reduced eccentric chamber communicating therewith, a core member revolubly mounted within said concentric chamber having radial slots and a concentric recess therein, vanes disposed in said slots adapted to be projected into said eccentric chamber, springs for said vanes, arms on said vanes arranged to project into said concentric recess, fingers on said arms, a multiple cam mounted in said recess adapted to engage said fingers, and a crank member arranged to actuate said multiple cam.

3. A compression brake for motor vehicles comprising a brake drum having a concentric chamber and a reduced eccentric chamber communicating therewith, a core member revolubly mounted within said concentric chamber having radial slots and a concentric recess therein, annular flap gaskets disposed in complemental grooves between said core and brake drum, vanes disposed in said radial slots adapted to be projected into said eccentric chamber, springs for said vanes, arms on said vanes arranged to project into said concentric recess, guides for said arms, fingers on said arms, a multiple cam mounted in said recess adapted to engage said fingers, a lid for said recess, and a crank member arranged to actuate said multiple cam.

JULIUS A. BRUSS.